United States Patent
Lee et al.

(10) Patent No.: US 7,130,589 B2
(45) Date of Patent: Oct. 31, 2006

(54) SELF-CALIBRATING APPARATUS AND METHOD IN A MOBILE TRANSCEIVER

(75) Inventors: Kwy-Ro Lee, Daejeon (KR); Pil-Soon Choi, Daejon (KR); Mi-Hyun Son, Gwanak-gu (KR); Seong-Soo Lee, Suwon-si (KR)

(73) Assignees: Sansung Electronics Co., Ltd.(KR); Korea Advanced Institute of Science and Technology (KAIST)(KR)

( * ) Notice: Subject to any disclaimer, the term of this patent is extended or adjusted under 35 U.S.C. 154(b) by 375 days.

(21) Appl. No.: 10/815,445

(22) Filed: Apr. 1, 2004

(65) Prior Publication Data

US 2004/0198340 A1    Oct. 7, 2004

(30) Foreign Application Priority Data

Apr. 2, 2003    (KR) .................... 10-2003-0020828

(51) Int. Cl.
*H04B 17/00* (2006.01)
*H03C 1/62* (2006.01)
*H04Q 7/20* (2006.01)

(52) U.S. Cl. .............. 455/67.11; 455/67.14; 455/115.1; 455/423

(58) Field of Classification Search .......... 455/67.11, 455/67.14, 115.1, 115.2, 226.1, 423, 225, 455/67.13, 68, 69
See application file for complete search history.

(56) References Cited

U.S. PATENT DOCUMENTS

| 5,771,263 | A |   | 6/1998  | Kanazawa et al.        |
|-----------|---|---|---------|------------------------|
| 5,835,850 | A | * | 11/1998 | Kumar ........... 455/67.14 |
| 6,009,317 | A |   | 12/1999 | Wynn                   |
| 6,118,811 | A |   | 9/2000  | Narumi et al.          |
| 2003/0186664 | A1 | * | 10/2003 | Shah ........... 455/232.1 |
| 2004/0203472 | A1 | * | 10/2004 | Chien ........... 455/68 |
| 2005/0159124 | A1 | * | 7/2005  | Shah ........... 455/226.1 |
| 2005/0181754 | A1 | * | 8/2005  | Wu et al. ........... 455/251.1 |
| 2006/0034356 | A1 | * | 2/2006  | Fechtel ........... 375/219 |

FOREIGN PATENT DOCUMENTS

| EP | 0 928 072   | 7/1999  |
| EP | 1 067 676   | 1/2001  |
| EP | 1 154 580   | 11/2001 |
| WO | WO 01/99298 | 12/2001 |

* cited by examiner

*Primary Examiner*—Sonny Trinh
(74) *Attorney, Agent, or Firm*—Dilworth & Barrese LLP (57) ABSTRACT

An apparatus and method for self-calibrating mismatching orthogonal signals and non-linearity of a circuit occurring in a mobile transceiver. For this, in a mobile terminal, a transmitter is used as a signal generator and a receiver is used as a response characteristic measurer. A base band processor calibrates mismatching signals and non-linearity in a reception side and a transmission side, based on a test signal received via the transmitter and a test signal received via the receiver.

12 Claims, 8 Drawing Sheets

SELF-CALIBRATING APPARATUS AND METHOD IN A MOBILE TRANSCEIVER

PRIORITY

This application claims priority under 35 U.S.C. § 119 to an application entitled "Self-Calibrating Apparatus and Method in a Mobile Transceiver" filed in the Korean Intellectual Property Office on Apr. 2, 2003 and assigned Serial No. 2003-20828, the contents of which are incorporated herein by reference.

BACKGROUND OF THE INVENTION

1. Field of the Invention

The present invention relates generally to a self-calibrating apparatus and method in a mobile transceiver, and in particular, to an apparatus and method for self-calibrating non-linearity and mismatching between orthogonal signals generated in a mobile transceiver.

2. Description of the Related Art

Generally, non-ideal characteristics such as non-linearity, mismatching, etc., are the fundamental causes of performance degradation in a mobile transceiver. Non-linearity is caused by a power amplifier and a mixer in a mobile transmitter, and is caused by a low-nose amplifier, a mixer, and an active filter in a mobile receiver. The non-linearity occurring in the mobile transmitter increases interference between neighbor channels. Therefore, non-linearity raises desensitization, blocking, cross-modulation, and inter-modulation problems in the mobile transceiver.

Mismatching is caused from gain and phase inconsistencies between an in-phase channel signal (or I-channel signal) path and a quadrature-phase channel signal (or Q-channel signal) path in a mobile transceiver that transmits an I-channel signal and a Q-channel signal by a constant phase difference. Mismatching occurring for such a reason increases a bit error rate (BER), leading to a decrease in performance of the mobile transceiver.

Therefore, in order to improve performance of a mobile transceiver, a method for calibrating (or compensating for) the non-linearity and mismatching must be provided.

Figure 1:
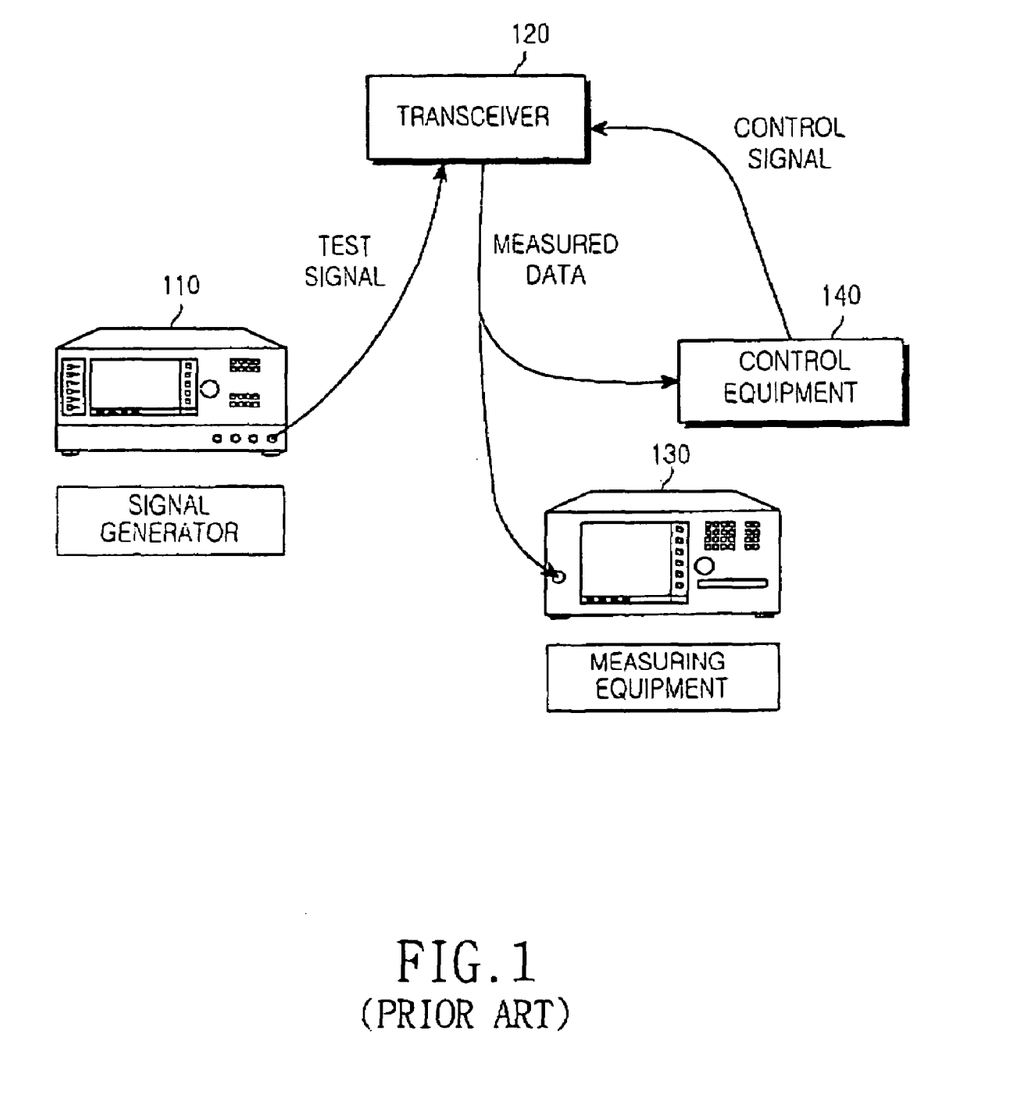
FIG. 1 is a diagram illustrating a system for calibrating non-linearity and mismatching occurring in a conventional mobile transceiver.

FIG. 1 is a diagram illustrating a system for calibrating non-linearity and mismatching occurring in a conventional mobile transceiver. Referring to FIG. 1, a signal generator 110 generates an electric signal, or a test signal, set by a measurer (or user). The test signal is provided to a mobile transceiver 120 to be tested. The mobile transceiver 120 outputs the test signal as measured data through a given processing procedure. The measured data is provided to a measuring equipment 130. The measuring equipment 130 outputs a response characteristic for the test signal based on the measured data so that the measurer can be aware of the response characteristic. Equipment such as a frequency analyzer and an oscilloscope can be used as the measuring equipment 130. The measurer determines whether to calibrate non-ideal characteristics such as non-linearity and mismatching in the mobile transceiver 120, by analyzing the response characteristic for the test signal. If the measurer determines to calibrate the non-ideal characteristics, the measurer manipulates a control equipment 140 to provide a control signal for calibrating the non-ideal characteristic to the mobile transceiver 120. The mobile transceiver 120 calibrates the non-ideal characteristic by calibrating corresponding parameters according to the control signal.

In alternative implementation, the calibration can be achieved based on the measured data output from the mobile transceiver 120 without manipulation of the control equipment 140 by the measurer. The control equipment 140 must generate a control signal for calibrating the non-ideal characteristic in response to the measured data. The control equipment 140 commonly uses two kinds of calibration methods: an analog trimming-type calibration method and a digital trimming-type calibration method. However, the analog trimming-type calibration method is expensive and is not adaptive to variation in an environment such as a temperature. Additionally, in the digital trimming-type calibration method, a circuit for measuring a non-ideal characteristic and an operation circuit for calibrating the measured non-ideal characteristic must be further added, and considerable power consumption occurs for this complicated operations.

Another example of calibrating mismatching in a mobile transceiver is disclosed in U.S. Pat. No. 6,009,317 assigned to Ericsson, the contents of which are incorporated herein by reference. However, the method proposed in this reference can only compensate for mismatching in a receiver by a digital processor. In addition, for the compensation, an external signal generator is used. That is, the method proposed in the reference cannot calibrate all non-ideal characteristics that are commonly generated in a mobile transceiver, and cannot solve the existing hardware complexity problem.

SUMMARY OF THE INVENTION

It is, therefore, an object of the present invention to provide a method for calibrating all possible non-ideal characteristics occurring in a mobile transceiver without using extra hardware.

It is another object of the present invention to provide a method for calibrating, in a receiver, non-linearity caused by a signal output from a transmitter upon receiving a test signal.

It is further another object of the present invention to provide a method for calibrating, in a receiver, mismatching caused by a signal output from a transmitter upon receiving a test signal.

It is yet another object of the present invention to provide a method for controlling a transmitter to calibrate non-linearity occurring in a receiver caused by a signal output from the transmitter upon receiving a test signal.

It is still another object of the present invention to provide a method for controlling a transmitter to calibrate mismatching occurring in a receiver caused by a signal output from the transmitter upon receiving a test signal.

In a first aspect of the present invention, there is provided a method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter, and an in-phase input terminal and a quadrature-phase input terminal connected to the receiver, the method comprising the steps of: controlling the switch so that an output of the transmitter is provided to the receiver; generating a first test signal associated with the in-phase output terminal and transmitting the first test signal through the transmitter; detecting an in-phase measurement signal provided via the in-phase input terminal and a quadrature-phase measurement signal provided via the quadrature-phase input terminal by processing the first test signal received via the switch in the receiver; if the quadrature-phase measurement signal does not have a value approaching '0', calibrating mismatching of the quadrature-phase measurement signal by controlling the receiver, estimating distortion occurred in the in-phase measurement signal, and then calibrating the distortion of the in-phase measurement signal by controlling the receiver; generating a second test signal associated with the quadrature-phase output terminal, and transmitting the second test signal via the transmitter; detecting an in-phase measurement signal provided via the in-phase input terminal and a quadrature-phase measurement signal provided via the quadrature-phase input terminal by processing the second test signal received via the switch in the receiver; if the in-phase measurement signal does not have a value approaching '0', calibrating mismatching of the in-phase measurement signal by controlling the receiver, estimating distortion occurred in the quadrature-phase measurement signal, and then calibrating the distortion of the quadrature-phase measurement signal by controlling the receiver; and if the calibration on mismatching and distortion is completed, controlling the switch so as to cut off a connection between the output terminal of the transmitter and the input terminal of the receiver.

In a second aspect of the present invention, there is provided a method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter and an in-phase input terminal and a quadrature-phase input terminal connected to the receiver, the method comprising the steps of: controlling the switch so that an output of the transmitter is provided to the receiver; generating a first test signal associated with the in-phase output terminal and transmitting the first test signal through the transmitter; detecting an in-phase measurement signal provided via the in-phase input terminal and a quadrature-phase measurement signal provided via the quadrature-phase input terminal by processing the first test signal received via the switch in the receiver; if the quadrature-phase measurement signal does not have a value approaching '0', calibrating mismatching of the quadrature-phase measurement signal by controlling the transmitter, estimating distortion occurred in the in-phase measurement signal, and then calibrating the distortion of the in-phase measurement signal by controlling the transmitter; generating a second test signal associated with the quadrature-phase output terminal, and transmitting the second test signal via the transmitter; detecting an in-phase measurement signal provided via the in-phase input terminal and a quadrature-phase measurement signal provided via the quadrature-phase input terminal by processing the second test signal received via the switch in the receiver; if the in-phase measurement signal does not have a value approaching '0', calibrating mismatching of the in-phase measurement signal by controlling the transmitter, estimating distortion occurred in the quadrature-phase measurement signal, and then calibrating the distortion of the quadrature-phase measurement signal by controlling the transmitter; and if the calibration on mismatching and distortion is completed, controlling the switch so as to cut off a connection between the output terminal of the transmitter and the input terminal of the receiver.

In a third aspect of the present invention, there is provided a method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter and an in-phase input terminal and a quadrature-phase input terminal connected to the receiver, the method comprising the steps of: controlling the switch so that an output of the transmitter is provided to the receiver; generating a first test signal associated with the in-phase output terminal and transmitting the first test signal through the transmitter; estimating mismatching occurred in a first quadrature-phase measurement signal provided via the quadrature-phase input terminal and non-linearity occurred in a first in-phase measurement signal provided via the in-phase input terminal by processing the first test signal received via the switch in the receiver; generating a second test signal associated with the quadrature-phase output terminal, and transmitting the second test signal via the transmitter; estimating mismatching occurred in a second in-phase measurement signal provided via the in-phase input terminal and non-linearity occurred in a second quadrature-phase measurement signal provided via the quadrature-phase input terminal by processing the second test signal received via the switch in the receiver; controlling the receiver to calibrate the mismatching measured on the first quadrature-phase measurement signal and the second in-phase measurement signal and the non-linearity measured on the first in-phase measurement signal and the second quadrature-phase measurement signal; and if the calibration on mismatching and distortion is completed, controlling the switch so as to cut off a connection between the output terminal of the transmitter and the input terminal of the receiver.

In a fourth aspect of the present invention, there is provided a method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter and an in-phase input terminal and a quadrature-phase input terminal connected to the receiver, the method comprising the steps of: controlling the switch so that an output of the transmitter is provided to the receiver; generating a first test signal associated with the in-phase output terminal and transmitting the first test signal through the transmitter; estimating mismatching occurred in a first quadrature-phase measurement signal provided via the quadrature-phase input terminal and non-linearity occurred in a first in-phase measurement signal provided via the in-phase input terminal by processing the first test signal received via the switch in the receiver; generating a second test signal associated with the quadrature-phase output terminal, and transmitting the second test signal via the transmitter; estimating mismatching occurred in a second in-phase measurement signal provided via the in-phase input terminal and non-linearity occurred in a second quadrature-phase measurement signal provided via the quadrature-phase input terminal by processing the second test signal received via the switch in the receiver; controlling the transmitter to calibrate the mismatching measured on the first quadrature-phase measurement signal and the second in-phase measurement signal and the non-linearity measured on the first in-phase measurement signal and the second quadrature-phase measurement signal; and if the calibration on mismatching and distortion is completed, controlling the switch so as to cut off a connection between the output terminal of the transmitter and the input terminal of the receiver.

In a fifth aspect of the present invention, there is provided an apparatus for self-calibrating non-linearity in a mobile terminal including a transmitter and a receiver, the apparatus comprising: a switching for connecting an output terminal of the transmitter to an input terminal of the receiver according to a switching control signal; and a controller for generating, when calibration on non-linearity is requested, a predetermined test signal after outputting the switching control signal, outputting the generated test signal via the transmitter, estimating non-linearity based on a test signal received via the receiver, calibrating non-linearity in a reception side by controlling the receiver, and calibrating non-linearity in a transmission side by controlling the transmitter.

In a sixth aspect of the present invention, there is provided a method for self-calibrating non-linearity in a mobile terminal including a transmitter, a receiver, and a switch for connecting an output terminal of the transmitter to an input terminal of the receiver, the method comprising the steps of: connecting the output terminal of the transmitter to the input terminal of the receiver by controlling the switch; generating a predetermined test signal, transmitting the test signal via the transmitter, and estimating non-linearity based on a test signal received via the receiver in response to the transmitted test signal; and calibrating non-linearity in a reception side by controlling the receiver according to the estimation result, and calibrating non-linearity in a transmission side by controlling the transmitter.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

Before a detailed description of embodiments of the present invention is given, terms to be used in the following description will be defined below.

I_tx signal: it is a test signal output from a controller via an I_tx terminal to calibrate mismatching and non-linearity at a transmitter or a receiver.

Q_tx signal: it is a test signal output from a controller via a Q_tx terminal to calibrate mismatching and non-linearity at a transmitter or a receiver.

I_tx terminal: it is a path through which a controller outputs an I_tx signal.

Q_tx terminal: it is a path through which a controller outputs a Q_tx signal.

I_rx signal: it is a test signal received at a controller via an I_rx terminal to calibrate mismatching and non-linearity at a transmitter or a receiver.

Q_rx signal: it is a test signal received at a controller via a Q_rx terminal to calibrate mismatching and non-linearity at a transmitter or a receiver.

I_rx terminal: it is a path through which an I_rx signal is provided to a controller.

Q_rx terminal: it is a path through which a Q_rx signal is provided to a controller.

Q_rx mismatching signal: it is a signal provided to a controller via a Q_rx terminal due to mismatching with an I_rx signal.

I_rx mismatching signal: it is a signal provided to a controller via an I_rx terminal due to mismatching with a Q_rx signal.

In the following description, the present invention proposes a mobile terminal that provides a test signal generated in a transmitter to a receiver, and a detailed description will be made of a method for calibrating mismatching and non-linearity estimated based on the test signal. That is, in the present invention, it is proposed that a transmitter is used as a signal generator and a receiver is used as a response characteristic measurer. Here, the "test signal" refers to all signals having a specific shape. A pulse or a signal having a simple wave (a sine wave, a cosine wave and the like) can be used as the test signal.

Figure 2:
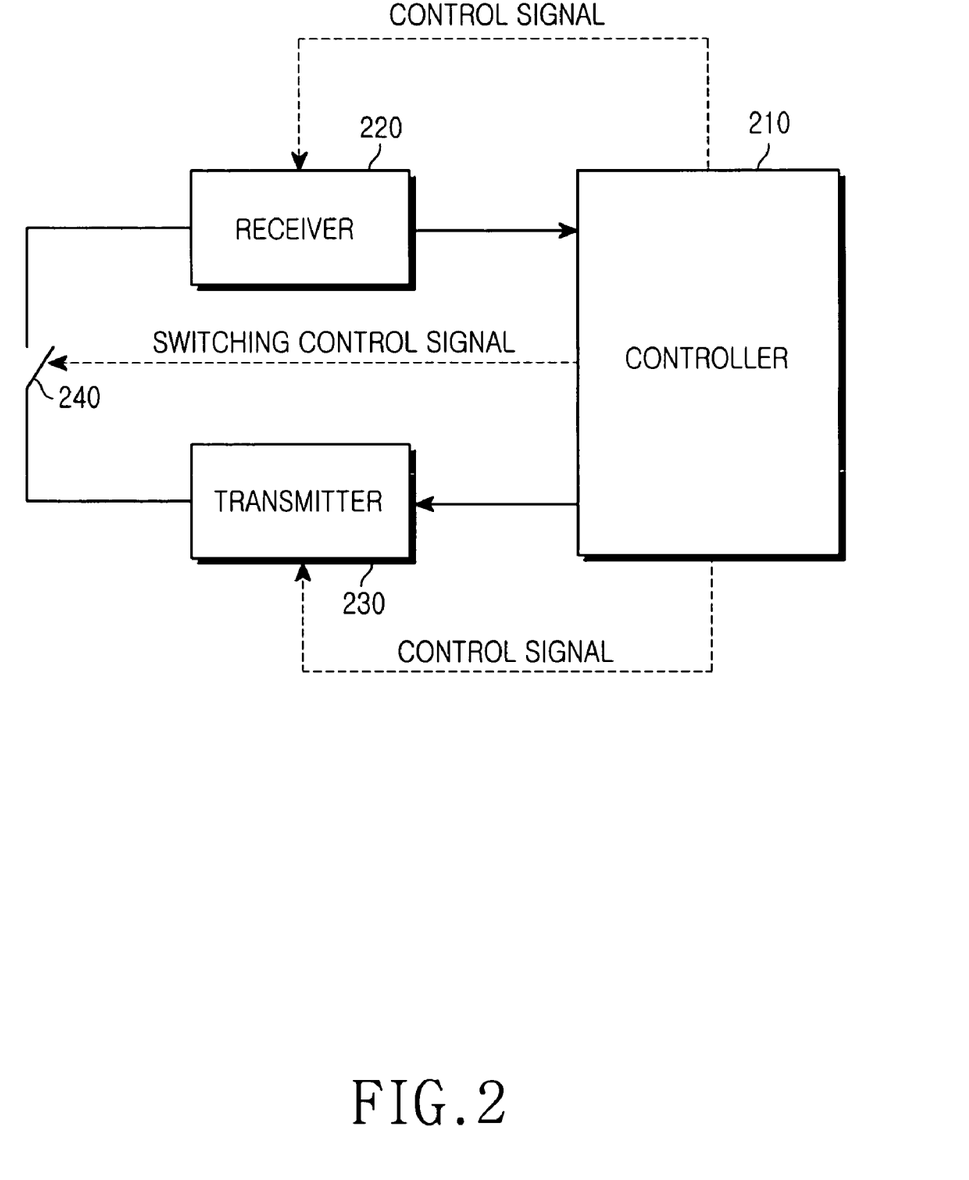
FIG. 2 is a block diagram illustrating a structure of a mobile terminal according to an embodiment of the present invention.

FIG. 2 is a block diagram illustrating a structure of a mobile terminal according to an embodiment of the present invention. Referring to FIG. 2, a controller 210 requests a transmitter 230 to generate a predetermined test signal, in response to a test request. At the same time, the controller 210 outputs a switching control signal indicating a command to connect the transmitter 230 to a receiver 220. The transmitter 230 generates a test signal in response to a request from the controller 210. A switch 240 provides the test signal output from the transmitter 230 to an input terminal of the receiver 220 according to the switching control signal from the controller 210. The receiver 220 receives the test signal, and provides the received test signal to the controller 210. The controller 210 compares a wave of the test signal output from the transmitter 230 with a wave of the test signal received via the receiver 220, and generates a control signal for calibrating mismatching and non-linearity according to the comparison result. That is, the controller 210 calibrates the mismatching and non-linearity according to a response characteristic for the test signal.

The calibration of mismatching and non-linearity can be divided into calibration controlled by the receiver 220 and calibration controlled by the transmitter 230. The mismatching calibration controlled by the receiver 220 is called 'RX mismatching calibration', and the non-linearity calibration controlled by the receiver 220 is called 'RX non-linearity calibration'. The mismatching calibration controlled by the transmitter 230 is called 'TX mismatching calibration', and the non-linearity calibration controlled by the transmitter 230 is called 'TX non-linearity calibration'. The controller 210 can control calibration of mismatching and non-linearity according to the comparison result by adjusting various parameter values used in the receiver 220 and the transmitter 230. Because this is a well-known technique, a detailed description thereof will be omitted for simplicity.

By calibrating mismatching and non-linearity in the above-described manner, a mobile terminal can perform appropriate mismatching calibration and non-linearity calibration on signals received over a radio channel.

Figure 3:
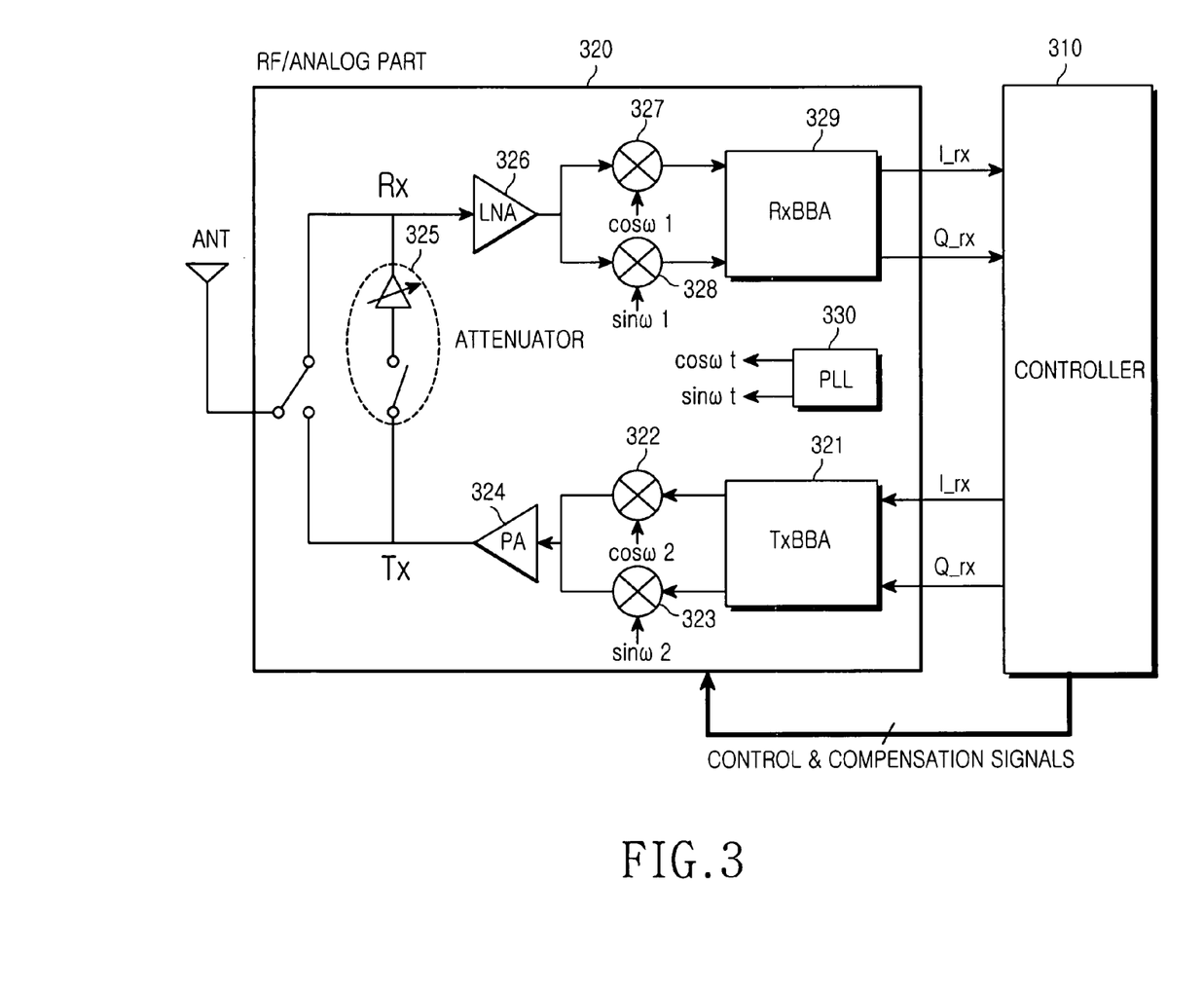
FIG. 3 is a block diagram illustrating a mobile transceiver performing communication based on an in-phase channel signal (or I-channel signal) and a quadrature-phase channel signal (Q-channel signal) according to an embodiment of the present invention.

FIG. 3 is a block diagram illustrating a mobile transceiver performing communication based on an in-phase channel signal (or I-channel signal) and a quadrature-phase channel signal (Q-channel signal) according to an embodiment of the present invention. Referring to FIG. 3, a controller 310 generates a test signal when mismatching and non-linearity calibration is required. For mismatching and non-linearity calibration, the controller 310 generates a switching control signal and an attenuation control signal so that an output of a transmitter can be provided to an input terminal of a receiver. In FIG. 3, because an I-channel signal and a Q-channel signal are separated, the controller 310 performs calibration of mismatching and non-linearity on the Q channel after performing calibration of mismatching and non-linearity on the I channel.

The calibration of mismatching and non-linearity is separately performed on a transmitter and a receiver. More specifically, the controller 310 receives an I_rx signal and a Q_rx mismatching signal through a receiver after transmitting an I_tx signal through a transmitter. The controller 310 performs non-linearity calibration based on the I_rx signal and mismatching calibration based on the Q_rx mismatching signal by controlling the receiver. The controller 310 receives an I_rx mismatching signal and a Q_rx signal through the receiver after transmitting a Q_tx signal through the transmitter. The controller 310 performs non-linearity calibration based on the Q_rx signal and mismatching calibration based on the I_rx mismatching signal by controlling the receiver.

Additionally, the controller 310 receives an I_rx signal and a Q_rx mismatching signal through the receiver after transmitting an I_tx signal through the transmitter. The controller 310 controls the transmitter in order to calibrate non-linearity occurred in the I_rx signal, and controls the transmitter in order to calibrate mismatching occurred in the Q_rx mismatching signal. The controller 310 receives an I_rx mismatching signal and a Q_rx signal through the receiver after transmitting a Q_tx signal through the transmitter. The controller 310 controls the transmitter in order to calibrate non-linearity occurred in the Q_rx signal, and controls the transmitter in order to calibrate mismatching occurred in the I_rx mismatching signal.

Among the elements constituting the transmitter and the receiver, the elements that are involved in calibration of mismatching and non-linearity perform calibration of mismatching and non-linearity occurring in the transmitter or the receiver, under the control of the controller 310.

Commonly, in a mobile communication system, a modem includes a base band analog system (BBA) therein. The BBA includes a reception BBA (Rx BBA) 329 for converting a received intermediate frequency (IF) band signal into a digital base band (BB) signal, and a transmission BBA (Tx BBA) 321 for converting a digital BB transmission signal into an analog IF band signal. In a Code Division Multiple Access (CDMA) mobile communication system, which is a typical mobile communication system, 1.25 MHz is used as the base band and a MHz-band is used as the IF band. Therefore, the Tx BBA 321 converts a BB test signal provided from the controller 310 via an I-channel path I_tx or a Q-channel path Q_tx into an IF band signal. Alternatively, the Rx BBA 329 can convert a radio frequency (RF) band signal into a digital BB signal, and the Tx BBA 321 can convert a digital BB signal into an RF band signal. For the convenience of explanation, it will be assumed herein that a digital BB signal is converted into an IF band signal. However, it should be noted that the present invention can be applied in the same way even when a digital BB signal is converted into an RF band signal.

A signal provided through the I_tx and then converted into an IF band signal is multiplied by 'cos ω2' by a multiplier 322. A signal provided through the Q_tx and then converted into an IF band signal is multiplied by 'sin ω2' by a multiplier 323. The 'cos ω2' and 'sin ω2', which are generated by a phase locked loop (PLL) 330, are used so that an I-channel signal and a Q-channel signal have a phase difference of 90°. The low-power I-channel signal and Q-channel signal output from the multipliers 322 and 323 are amplified by a power amplifier (PA) 324 to a level necessary for transmission through a radio channel.

A feedback circuit 325 including a switch and an attenuator attenuates a signal output from the transmitter at a predetermined rate under the control of the controller 310, and switches the attenuated signal to an input terminal of the receiver. The switch switches an output signal of the transmitter to the input terminal of the receiver according to a switching control signal from the controller 310. The attenuator attenuates a signal provided via the switch at a predetermined rate under the control of the controller 310, and provides the attenuated signal to the input terminal of the receiver. For example, the attenuator attenuates an input signal at a higher attenuation rate for calibration of mismatching and non-linearity of a reception side, and attenuates an input signal at a lower attenuation rate for calibration of mismatching and non-linearity of a transmission side.

A low noise amplifier (LNA) 326 of the receiver removes a noise component included in a reception signal provided via the attenuator, and amplifies the nose-removed signal to a predetermined level. A multiplier 327 multiplies the reception signal from the LNA 326 by 'cos ω1' provided from the PLL 330, and outputs an IF band I-channel signal. A multiplier 328 multiplies the reception signal from the LNA 326 by 'sin ω1' provided from the PLL 330, and outputs an IF band Q-channel signal. The IF band I-channel signal and Q-channel signal are input to the Rx BBA 329, and then output to the controller 310 as BB reception signals, i.e., I_rx signal and Q_rx signal.

Figure 4:
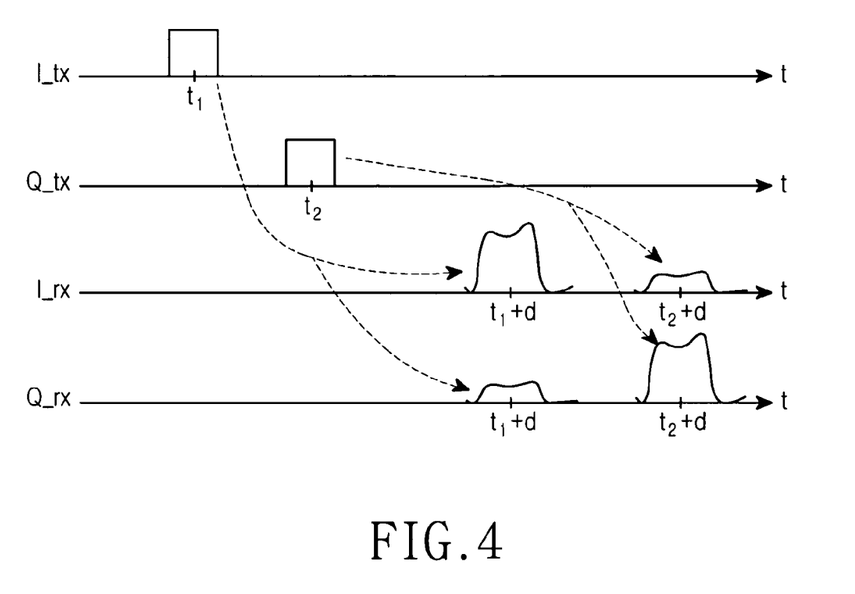
FIG. 4 is a timing diagram illustrating transmission waves and reception waves when mismatching and non-linearity of a reception side are calibrated according to an embodiment of the present invention.

FIG. 4 is a timing diagram illustrating transmission waves and reception waves when mismatching and non-linearity of a reception side are calibrated according to an embodiment of the present invention. Referring to FIG. 4, an I_tx signal is transmitted at a time '$t_1$', and this is received as an I_rx signal at a time '$t_1+d$' considering a transmission delay 'd'.

Comparing a wave of the I_tx signal with a wave of the I_rx signal, it is noted that the wave of the I_rx signal is distorted. The distortion is caused by non-linearity of elements for receiving an I-channel signal in a receiver. Because a Q_tx signal is not transmitted at the time '$t_1$', it is preferable that a Q_rx signal should not appear at the time '$t_1+d$'. However, as illustrated in FIG. 4, a Q_rx mismatching signal with an unspecified wave appears as a Q_rx signal at the time '$t_1+d$'. The Q_rx mismatching signal with an unspecified wave occurs due to mismatching between an I channel and a Q channel in the receiver.

A Q_tx signal is transmitted at a time '$t_2$', and is received as an Q_rx signal at a time '$t_2+d$' considering a transmission delay 'd'. Comparing a wave of the Q_tx signal with a wave of the Q_rx signal, it is noted that the wave of the Q_rx signal is distorted. The distortion is caused by non-linearity of elements for receiving a Q-channel signal in the receiver. Further, because an I_tx signal is not transmitted at the time '$t_2$', it is preferable that an I_rx signal should not appear at the time '$t_2+d$'. However, as illustrated in FIG. 4, an I_rx mismatching signal with an unspecified wave appears as an I_rx signal at the time '$t_2+d$'. The I_rx mismatching signal with an unspecified wave is caused by mismatching between an I channel and a Q channel in the receiver.

The non-linearity characteristic and the mismatching characteristic between an I channel and a Q channel in a receiver can be calibrated by adjusting operation parameters of corresponding elements of the receiver.

Figure 5:
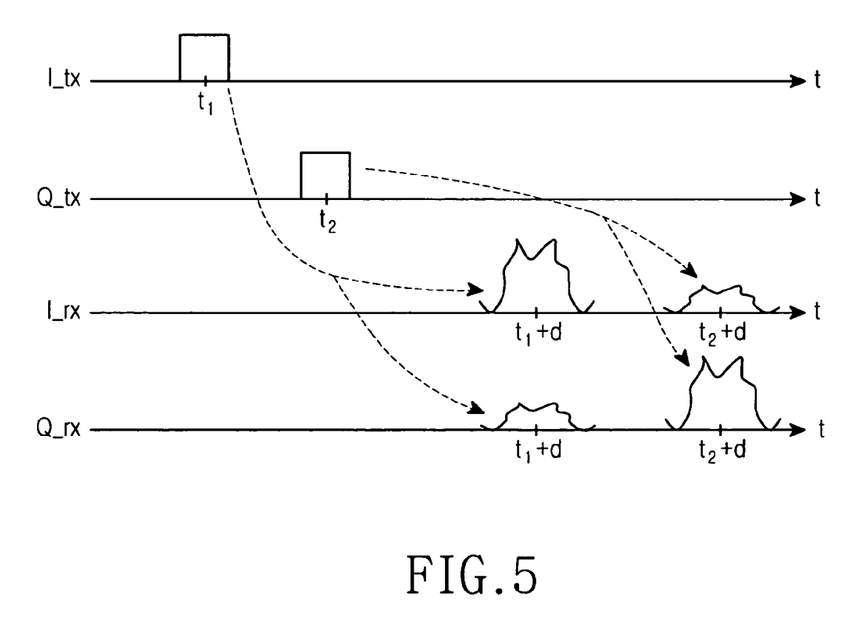
FIG. 5 is a timing diagram illustrating transmission waves and reception waves when mismatching and non-linearity of a transmission side are calibrated according to an embodiment of the present invention.

FIG. 5 is a timing diagram illustrating transmission waves and reception waves when mismatching and non-linearity of a transmission side are calibrated according to an embodiment of the present invention. Referring to FIG. 5, an I_tx signal is transmitted at a time '$t_1$', and is received as an I_rx signal at a time '$t_1+d$' considering a transmission delay 'd'. Comparing a wave of the I_tx signal with a wave of the I_rx signal, it is noted that the wave of the I_rx signal is distorted. The distortion is caused by non-linearity of elements for receiving an I-channel signal in a transmitter. Further, because a Q_tx signal is not transmitted at the time '$t_1$', it is preferable that a Q_rx signal should not appear at the time '$t_1+d$'. However, as illustrated in FIG. 5, a Q_rx mismatching signal with an unspecified wave appears as a Q_rx signal at the time '$t_1+d$'. The Q_rx mismatching signal with an unspecified wave is caused by mismatching between an I channel and a Q channel in the transmitter.

A Q_tx signal is transmitted at a time '$t_2$', and is received as an Q_rx signal at a time '$t_2+d$' considering a transmission delay 'd'. Comparing a wave of the Q_tx signal with a wave of the Q_rx signal, it is noted that the wave of the Q_rx signal is distorted. The distortion is caused by non-linearity of elements for receiving a Q-channel signal in the transmitter. Further, because an I_tx signal is not transmitted at the time '$t_2$', it is preferable that an I_rx signal should not appear at the time '$t_2+d$'. However, as is illustrated in FIG. 5, an I_rx mismatching signal with an unspecified wave appears as an I_rx signal at the time '$t_2+d$'. The I_rx mismatching signal with an unspecified wave is caused by mismatching between an I channel and a Q channel in the transmitter.

As indicated above, the non-linearity characteristic and the mismatching characteristic between an I channel and a Q channel in a transmitter can be calibrated by adjusting operation parameters of corresponding elements of the transmitter.

Preferred embodiments of the present invention will now be described in detail herein below with reference to the accompanying drawings.

First Embodiment

A procedure for performing mismatching calibration and non-linearity calibration according to a first embodiment of the present invention will be described in detail herein below with reference to FIGS. 6 and 7.

1. Calibration for Reception Side (RX mismatching calibration, RX non-linearity calibration)

Figure 6:
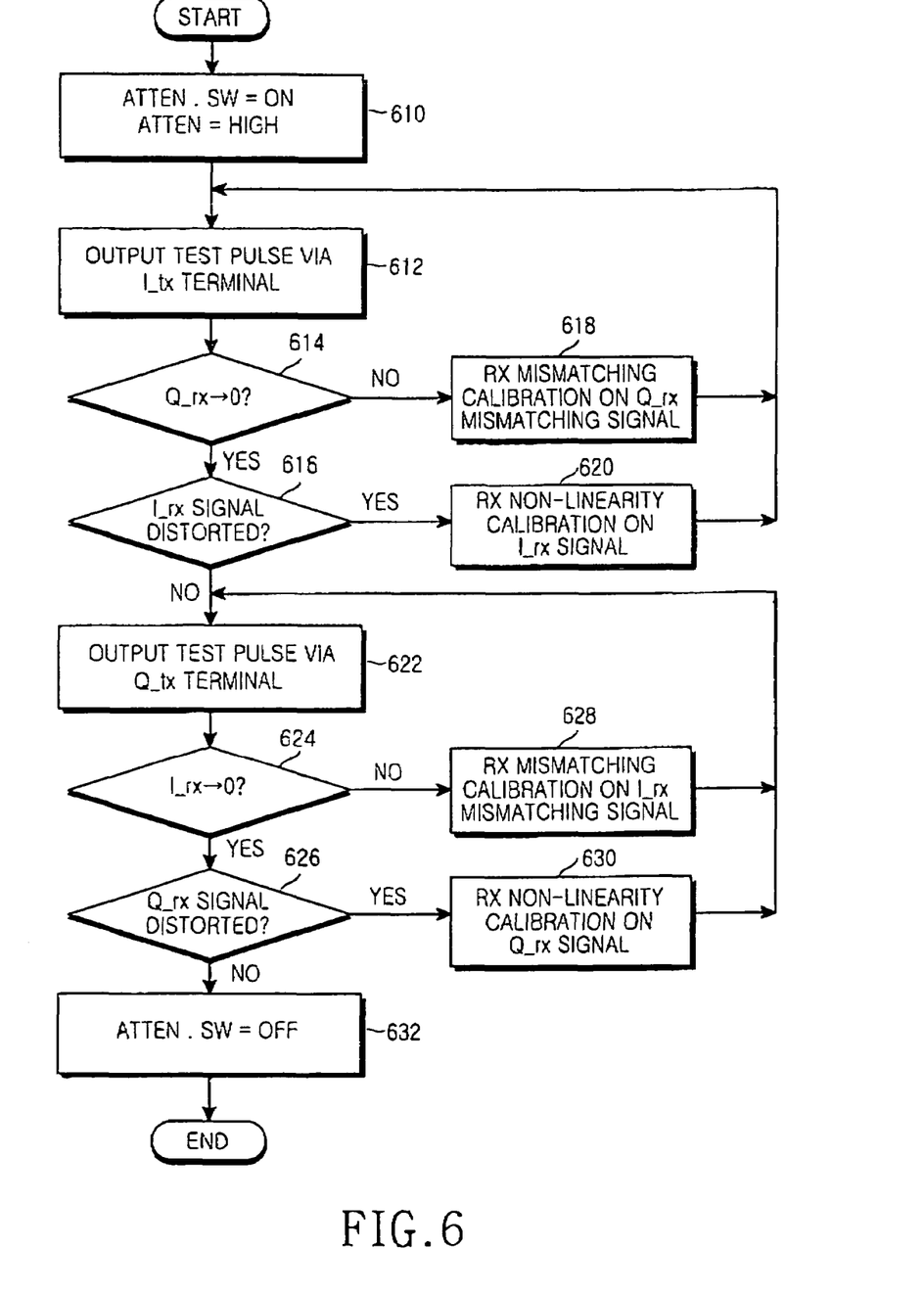
FIG. 6 is a flowchart illustrating a procedure for calibrating mismatching and non-linearity in a reception side according to an embodiment of the present invention.

FIG. 6 is a flowchart illustrating a procedure for calibrating mismatching and non-linearity in a reception side. In FIG. 6, regarding calibration for a reception side, calibration of mismatching and non-linearity on an I-channel signal is performed through steps 610 to 620, and calibration of mismatching and non-linearity on a Q-channel signal is performed through steps 622 to 632. In the following description, it should be noted that in calibration of mismatching and non-linearity on an I-channel signal, a test signal is output through an I-channel transmission path (I_tx terminal), and in calibration of mismatching and non-linearity on a Q-channel signal, a test signal is output through a Q-channel transmission path (Q_tx terminal).

1.1 Calibration on I-Channel Signal

In step 610, a controller 310 outputs a switching control signal for setting up a path for calibrating RX mismatching and RX non-linearity, and outputs an attenuation control signal for determining attenuation of a signal provided from a transmission side to a reception side. In response to the switching control signal, a switch is turned on to connect the transmission side to the reception side, and in response to the attenuation control signal, an attenuator determines an attenuation level of a signal provided from the transmission side. When calibrating mismatching and non-linearity of the reception side, the controller 310 outputs an attenuation control signal of 'high' to increase an attenuation level by the attenuator.

Thereafter, in step 612, the controller 310 outputs a predetermined test signal, or an I_tx signal, via an I_tx terminal. The I_tx signal output from the controller 310 is provided to a transmitter constituting an RF analog part 320. A Tx BBA 321 included in the transmitter converts the BB I_tx signal provided via the I_tx terminal into an IF band I_tx signal. The IF band I_tx signal is multiplied by 'cos ω2' by a multiplier 322, and then amplified by a PA 324 to a level necessary for transmission. The amplified I_tx signal is input to the attenuator via the switch, and the attenuator attenuates the received I_tx signal by a specific amount and provides the attenuated I_tx signal to the reception side.

An LNA 326 of the reception side removes a noise component included in a reception signal, and amplifies the noise-removed signal to a specific level. A reception signal output from the LNA 326 is multiplied by 'cos ω1' provided from a PLL 330 by a multiplier 327. The IF band reception signal is input to an Rx BBA 329 where it is converted into a BB reception signal, or an I_rx signal. The controller 310 is provided with the I_rx signal via an I_rx terminal. At this point, no signal must be received via a Q_rx terminal. However, due to mismatching between an I channel and a Q channel, a signal with an unspecified wave, or a Q_rx mismatching signal, appears via the Q_rx terminal. The Q_rx mismatching signal is caused by mismatching between the I channel and the Q channel in a receiver. An example of the Q_rx mismatching signal is illustrated in FIG. 4.

In step 614, the controller 310 determines whether the Q_rx mismatching signal approaches '0'. If the Q_rx mismatching signal approaches '0', the controller 310 proceeds to step 616, determining that a mismatching characteristic of a corresponding mobile terminal for the I_tx signal is good in the reception side. However, if it is determined that the Q_rx mismatching signal does not approach '0', the controller 310 proceeds to step 618 where it performs RX mismatching calibration on the Q_rx mismatching signal and then returns to step 612. Steps 614 and 618 are repeatedly performed until it is determined that the Q_rx mismatching signal approaches '0'.

If it is determined that the Q_rx mismatching signal has a value approaching '0', the controller 310 proceeds to step 616 where it determines whether distortion has occurred in the I_rx signal provided via the I_rx terminal. Whether distortion has occurred in the I_rx signal can be determined by comparing by the controller 310 a wave of the transmitted test signal, or the I_tx signal, with a wave of the I_rx signal. The I_rx signal distortion is caused by non-linearity of elements for receiving an I-channel signal in the receiver. An example of the distorted I_rx signal has been illustrated in FIG. 4.

If it is determined in step 616 that distortion has occurred in the I_rx signal, the controller 310 proceeds to step 620. In step 620, the controller 310 controls corresponding elements of the reception side to perform RX non-linearity calibration on the distortion occurred in the I_rx signal due to non-linearity, and then returns to step 612. Steps 616 and 620 are repeatedly performed until a wave of the I_rx signal becomes similar to a wave of the I_tx signal.

If the calibration of RX mismatching and RX non-linearity on the I-channel signal is completed in the reception side, the controller 310 proceeds to step 622 where it performs a procedure for calibrating RX mismatching and RX non-linearity for a Q-channel signal in the reception side.

1.2 Calibration on Q-Channel Signal

In step 622, the controller 310 outputs a predetermined test signal, or a Q_tx signal, via a Q_tx terminal. The Q_tx signal output from the controller 310 is provided to the transmitter constituting the RF analog part 320. The Tx BBA 321 included in the transmitter converts the BB Q_rx signal provided via the Q_tx terminal into an IF band Q_tx signal. The IF band Q_tx signal is multiplied by 'sin ω2' by a multiplier 323, and then amplified by the PA 324 to a level necessary for transmission. The amplified Q_tx signal is input to the attenuator via the switch, and the attenuator attenuates the received Q_tx signal by a specific amount and provides the attenuated Q_tx signal to the reception side.

The LNA 326 of the reception side removes a noise component included in a reception signal, and amplifies the noise-removed signal to a specific level.

A reception signal output from the LNA 326 is multiplied by 'sin ω1' provided from the PLL 330 by a multiplier 328. The IF band reception signal is input to the Rx BBA 329 where it is converted into a BB reception signal, or a Q_rx signal. The controller 310 is provided with the Q_rx signal via a Q_rx terminal. At this point, no signal must be received via an I_rx terminal. However, due to mismatching between the I channel and the Q channel, a signal with an unspecified wave, or an I_rx mismatching signal, appears via the I_rx terminal. The I_rx mismatching signal is caused by mismatching between the I channel and the Q channel in the receiver. An example of the I_rx mismatching signal is illustrated in FIG. 4.

In step 624, the controller 310 determines whether the I_rx mismatching signal provided via the I_rx terminal approaches '0'. If the I_rx mismatching signal approaches '0', the controller 310 proceeds to step 626, determining that a mismatching characteristic of a corresponding mobile terminal for the Q-channel is good in the reception side. However, if it is determined that the I_rx mismatching signal does not approach '0', the controller 310 proceeds to step 628 where it performs RX mismatching calibration on the I_rx mismatching signal by controlling elements of the reception side and then returns to step 622. Steps 624 and 628 are repeatedly performed until it is determined that the I_rx mismatching signal approaches '0'.

If it is determined that the I_rx mismatching signal has a value approaching '0', the controller 310 proceeds to step 626 where it determines whether distortion has occurred in the Q_rx signal provided via the Q_rx terminal. Whether distortion has occurred in the Q_rx signal can be determined by comparing by the controller 310 a wave of the transmitted Q_tx signal with a wave of the Q_rx signal. The Q_rx signal distortion is caused by non-linearity of elements for receiving a Q-channel signal in the receiver. An example of the distorted Q_rx signal is illustrated in FIG. 4.

If it is determined in step 626 that distortion has occurred in the Q_rx signal, the controller 310 proceeds to step 630. In step 630, the controller 310 controls corresponding elements of the reception side to perform RX non-linearity calibration on the distortion occurred in the Q_rx signal due to non-linearity, and then returns to step 622. Steps 626 and 630 are repeatedly performed until a wave of the Q_rx signal becomes similar to a wave of the Q_tx signal.

If the calibration of RX mismatching and RX non-linearity on the Q-channel signal is completed in the reception side, the controller 310 proceeds to step 632 where it outputs a switching control signal and an attenuation control signal for initializing a path and an attenuation for calibrating the RX mismatching and the RX non-linearity.

2. Calibration for Transmission Side (TX mismatching calibration, TX non-linearity calibration)

Figure 7:
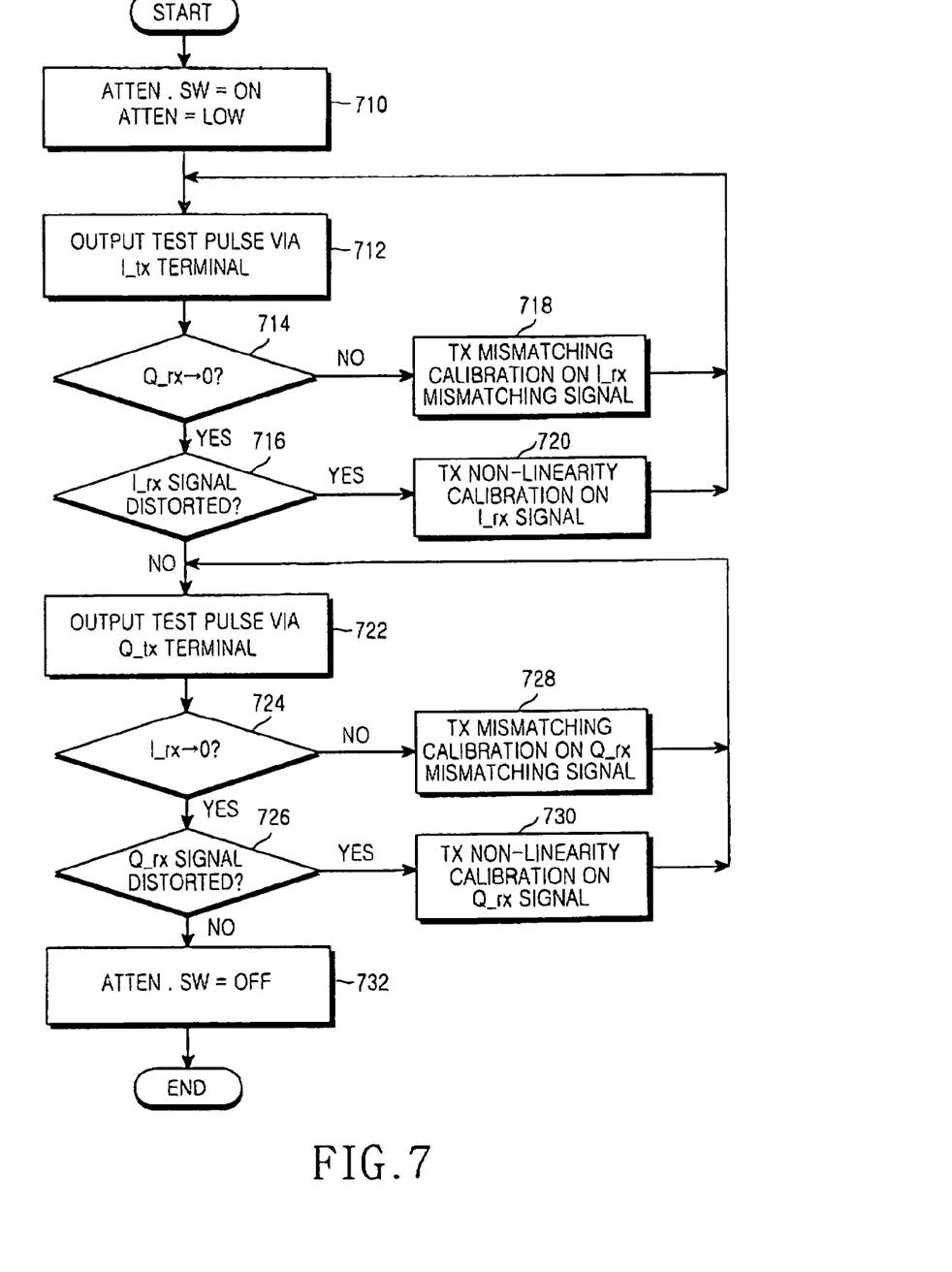
FIG. 7 is a flowchart illustrating a procedure for calibrating mismatching and non-linearity in a transmission side according to an embodiment of the present invention.

FIG. 7 is a flowchart illustrating a procedure for calibrating mismatching and non-linearity in a transmission side. In FIG. 7, regarding calibration for a transmission side, calibration of mismatching and non-linearity on an I-channel signal is performed through steps 710 to 720, and calibration of mismatching and non-linearity on a Q-channel signal is performed through steps 722 to 732. In the following description, it should be noted that in calibration of mismatching and non-linearity on an I-channel signal, a test signal is output through an I-channel transmission path (I_tx terminal), and in calibration of mismatching and non-linearity on a Q-channel signal, a test signal is output through a Q-channel transmission path (Q_tx terminal).

2.1 Calibration on I-Channel Signal

In step 710, a controller 310 outputs a switching control signal for setting up a path for calibrating TX mismatching and TX non-linearity and an attenuation control signal determining attenuation of a signal provided from a transmission side to a reception side. In response to the switching control signal, a switch is turned on to connect the transmission side to the reception side, and in response to the attenuation control signal, an attenuator determines an attenuation level of a signal provided from the transmission side. When calibrating mismatching and non-linearity of the reception side, the controller 310 outputs an attenuation control signal of 'low' to decrease an attenuation level by the attenuator.

Thereafter, in step 712, the controller 310 outputs a predetermined test signal, or an I_tx signal, via an I_tx terminal. The I_tx signal output from the controller 310 is provided to a transmitter constituting an RF analog part 320. A Tx BBA 321 constituting the transmitter converts the BB I_tx signal provided via the I_tx terminal into an IF band I_tx signal. The IF band I_tx signal is multiplied by 'cos ω2' by a multiplier 322, and then amplified by a PA 324 to a level necessary for transmission. The amplified I_tx signal is input to the attenuator via the switch, and the attenuator attenuates the received I_tx signal by a specific amount and provides the attenuated I_tx signal to the reception side.

An LNA 326 of the reception side removes a noise component included in a reception signal, and amplifies the noise-removed signal to a specific level. A reception signal output from the LNA 326 is multiplied by 'cos ω1' provided from a PLL 330 by a multiplier 327. The IF band reception signal is input to an Rx BBA 329 where it is converted into a BB reception signal, or an I_rx signal. The controller 310 is provided with the I_rx signal via an I_rx terminal. At this point, no signal must be received via a Q_rx terminal. However, due to mismatching between an I channel and a Q channel, a signal with an unspecified wave, or a Q_rx mismatching signal, appears via the Q_rx terminal. The Q_rx mismatching signal is caused by mismatching between the I channel and the Q channel in a transmitter. An example of the Q_rx mismatching signal is illustrated in FIG. 5.

In step 714, the controller 310 determines whether the Q_rx mismatching signal approaches '0'. If the Q_rx mismatching signal approaches '0', the controller 310 proceeds to step 716, determining that a mismatching characteristic of a corresponding mobile terminal for the I_tx signal is good in the transmission side. However, if it is determined that the Q_rx mismatching signal does not approach '0', the controller 310 proceeds to step 718 where it performs TX mismatching calibration on the Q_rx mismatching signal by controlling corresponding elements of the transmission side to adjust the I_tx signal and then returns to step 712. Steps 714 and 718 are repeatedly performed until it is determined that the Q_rx mismatching signal approaches '0'.

If it is determined that the Q_rx mismatching signal has a value approaching '0', the controller 310 proceeds to step 716 where it determines whether distortion has occurred in the I_rx signal provided via the I_rx terminal. Whether distortion has occurred in the I_rx signal can be determined by comparing by the controller 310 a wave of the transmitted test signal, or the I_tx signal, with a wave of the I_rx signal. The I_rx signal distortion is caused by non-linearity of elements for transmitting an I-channel signal in the transmitter. An example of the distorted I_rx signal is illustrated in FIG. 5.

If it is determined in step 716 that distortion has occurred in the I_rx signal, the controller 310 proceeds to step 720. In step 720, the controller 310 controls corresponding elements of the transmission side to adjust the I_tx signal thereby performing TX non-linearity calibration on the distortion occurred in the I_rx signal due to non-linearity, and then returns to step 712. Steps 716 and 720 are repeatedly performed until a wave of the I_rx signal becomes similar to a wave of the I_tx signal.

If the calibration of TX mismatching and TX non-linearity on the I-channel signal is completed in the transmission side, the controller 310 proceeds to step 722 where it performs a procedure for calibrating TX mismatching and TX non-linearity for a Q-channel signal in the transmission side.

2.2 Calibration on Q-Channel Signal

In step 722, the controller 310 outputs a predetermined test signal, or a Q_tx signal, via a Q_tx terminal. The Q_tx signal output from the controller 310 is provided to the transmitter constituting the RF analog part 320. The Tx BBA 321 constituting the transmitter converts the BB Q_tx signal provided via the Q_rx terminal into an IF band Q_tx signal. The IF band Q_tx signal is multiplied by 'sin ω2' by a multiplier 323, and then amplified by the PA 324 to a level necessary for transmission. The amplified Q_tx signal is input to the attenuator via the switch, and the attenuator attenuates the received Q_tx signal by a specific amount and provides the attenuated Q_rx signal to the reception side. The LNA 326 of the reception side removes a noise component included in a reception signal, and amplifies the noise-removed signal to a specific level.

A reception signal output from the LNA 326 is multiplied by 'sin ω1' provided from the PLL 330 by a multiplier 328. The IF band reception signal is input to the Rx BBA 329 where it is converted into a BB reception signal, or a Q_rx signal. The controller 310 is provided with the Q_rx signal via a Q_rx terminal. At this point, no signal must be received via an I_rx terminal. However, because of mismatching between the I channel and the Q channel, a signal with an unspecified wave, or an I_rx mismatching signal, appears via the I_rx terminal. The I_rx mismatching signal is cased by mismatching between the I channel and the Q channel in the transmitter. An example of the I_rx mismatching signal is illustrated in FIG. 5.

In step 724, the controller 310 determines whether the I_rx mismatching signal provided via the I_rx terminal approaches '0'. If the I_rx mismatching signal approaches '0', the controller 310 proceeds to step 726, determining that a mismatching characteristic of a corresponding mobile terminal for the Q-channel is good in the transmission side. However, if it is determined that the I_rx mismatching signal does not approach '0', the controller 310 proceeds to step 728 where it performs TX mismatching calibration on the I_rx mismatching signal by controlling elements of the transmission side, and then returns to step 722. Steps 724 and 728 are repeatedly performed until it is determined that the I_rx mismatching signal approaches '0'.

If it is determined that the I_rx mismatching signal has a value approaching '0', the controller 310 proceeds to step 726 where it determines whether distortion has occurred in the Q_rx signal provided via the Q_rx terminal. Whether distortion has occurred in the Q_rx signal can be determined by comparing by the controller 310 a wave of the transmitted Q_rx signal with a wave of the Q_rx signal. The Q_rx signal distortion is caused by non-linearity of elements for transmitting a Q-channel signal in the transmitter. An example of the distorted Q_rx signal is illustrated in FIG. 5.

If it is determined in step 726 that distortion has occurred in the Q_rx signal, the controller 310 proceeds to step 730. In step 730, the controller 310 controls corresponding elements of the transmission side to adjust the Q_tx signal thereby performing TX non-linearity calibration on the distortion occurred in the Q_rx signal due to non-linearity, and then returns to step 722. Steps 726 and 730 are repeatedly performed until a wave of the Q_rx signal becomes similar to a wave of the Q_tx signal.

If the calibration of TX mismatching and TX non-linearity on the Q-channel signal is completed in the transmission side, the controller 310 proceeds to step 732 where it outputs a switching control signal and an attenuation control signal for initializing a path and an attenuation for calibrating the TX mismatching and the TX non-linearity.

Second Embodiment

A procedure for performing mismatching calibration and non-linearity calibration according to a second embodiment of the present invention will be described in detail herein below with reference to FIGS. 8 and 9.

1. Calibration for Reception Side (RX mismatching calibration, RX non-linearity calibration)

Figure 8:
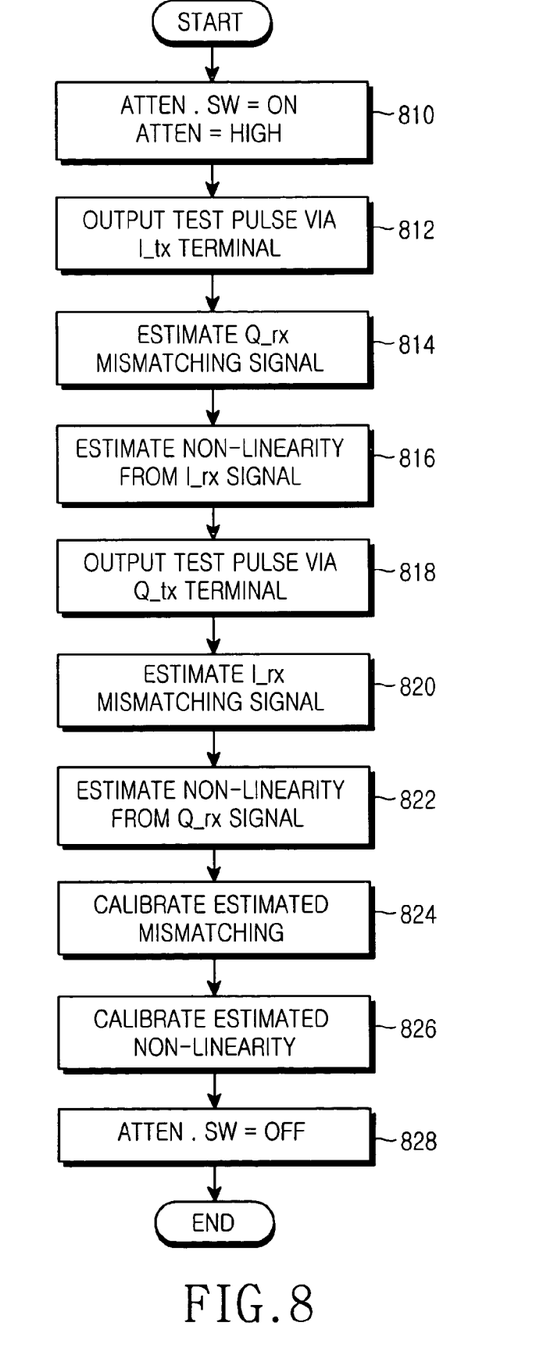
FIG. 8 is a flowchart illustrating a procedure for calibrating mismatching and non-linearity in a reception side according to an embodiment of the present invention.

FIG. 8 is a flowchart illustrating a procedure for calibrating mismatching and non-linearity in a reception side. Referring to FIG. 8, in step 810, a controller 310 outputs a switching control signal for setting up a path for calibrating RX mismatching and RX non-linearity, and outputs an attenuation control signal for determining attenuation of a signal provided from a transmission side to a reception side. In response to the switching control signal, a switch is turned on to connect the transmission side to the reception side, and in response to the attenuation control signal, an attenuator determines an attenuation level of a signal provided from the transmission side. When calibrating mismatching and non-linearity of the reception side, the controller 310 outputs an attenuation control signal of 'high' to increase an attenuation level by the attenuator.

Thereafter, in step 812, the controller 310 outputs a predetermined test signal, or an I_tx signal, via an I_tx terminal. The I_tx signal output from the controller 310 is provided to a receiver via a transmitter and the switch. The receiver provides a reception signal, or an I_rx signal, to the controller 310. The controller 310 is provided with the I_rx signal via an I_rx terminal. At this point, no signal must be received via a Q_rx terminal. However, because of the mismatching between an I channel and a Q channel, a signal with an unspecified wave, or a Q_rx mismatching signal, appears via the Q_rx terminal. The Q_rx mismatching signal is caused by mismatching between the I channel and the Q channel in the receiver. An example of the Q_rx mismatching signal is illustrated in FIG. 5.

In step 814, the controller 310 estimates the Q_rx mismatching signal. In step 816, the controller 310 estimates non-linearity from the I_rx signal provided via the I_rx terminal.

In step 818, the controller 310 outputs a predetermined test signal, or a Q_tx signal, via a Q_tx terminal. The Q_tx signal output from the controller 310 is provided to the receiver via the transmitter and the switch. The receiver provides a reception signal, or a Q_rx signal, to the controller 310. The controller 310 is provided with the Q_rx signal via a Q_rx terminal. At this point, no signal must be received via an I_rx terminal. However, because of the mismatching between the I channel and the Q channel, a signal with an unspecified wave, or an I_rx mismatching signal, appears via the I_rx terminal. An example of the I_rx mismatching signal is illustrated in FIG. 5.

In step 820, the controller 310 estimates the I_rx mismatching signal and. In step 822, the controller 310 estimates non-linearity from the Q_rx signal provided via the Q_rx terminal.

Thereafter, in step 824, the controller 310 controls the receiver to calibrate the mismatching estimated in the steps 814 and 820. In step 826, the controller 310 controls the receiver to calibrate the non-linearity estimated in the steps 816 and 822.

If the calibration of RX mismatching and RX non-linearity on an I-channel signal and a Q-channel signal is completed in the reception side, the controller 310 proceeds to step 828 where it outputs a switching control signal and an attenuation control signal for initializing a path and an attenuation for calibrating the RX mismatching and the RX non-linearity.

2. Calibration for Transmission Side (TX mismatching calibration, TX non-linearity calibration)

Figure 9:
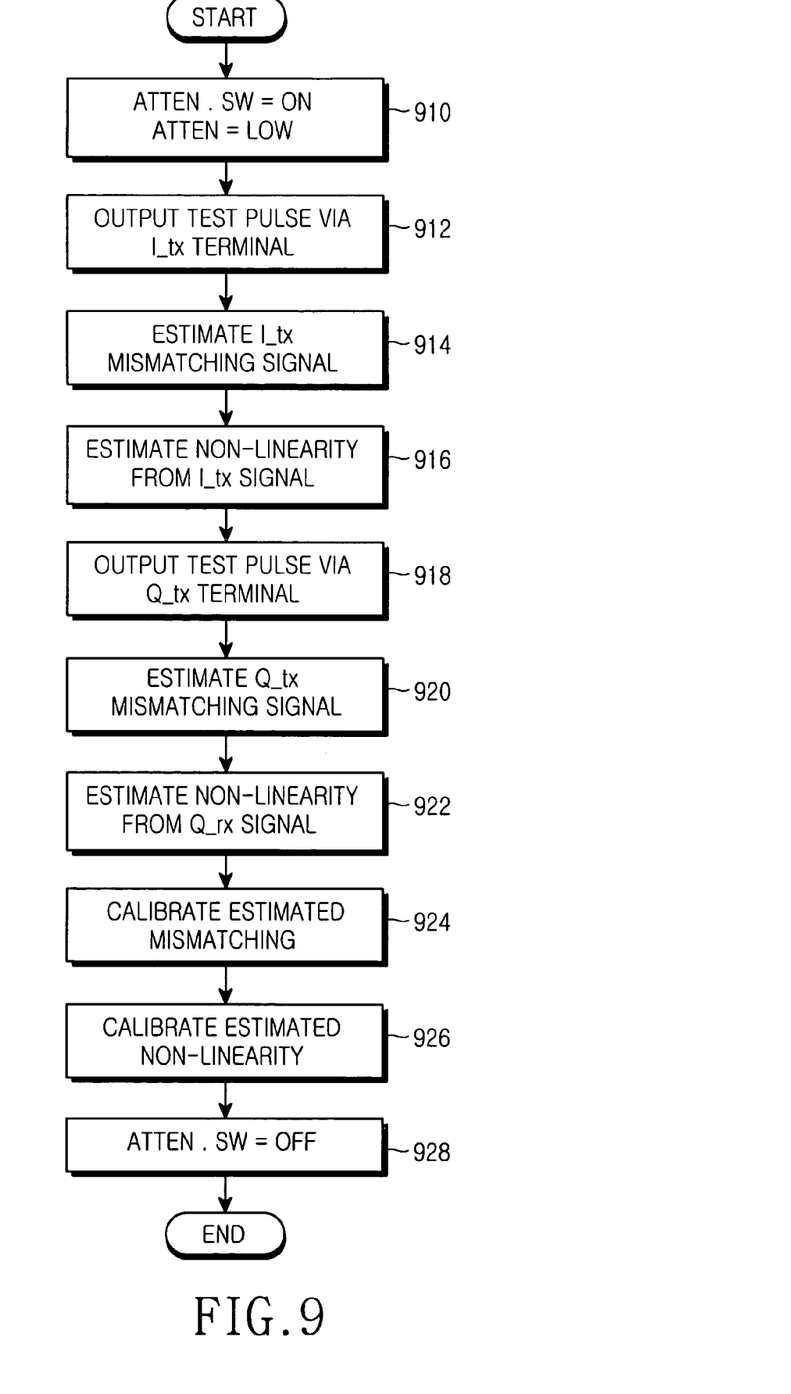
FIG. 9 is a flowchart illustrating a procedure for calibrating mismatching and non-linearity in a transmission side according to an embodiment of the present invention.

FIG. 9 is a flowchart illustrating a procedure for calibrating mismatching and non-linearity in a transmission side. Referring to FIG. 9, in step 910, the controller 310 outputs a switching control signal for setting up a path for calibrating TX mismatching and TX non-linearity, and outputs an attenuation control signal determining attenuation of a signal provided from a transmission side to a reception side. In response to the switching control signal, a switch is turned on to connect the transmission side to the reception side, and in response to the attenuation control signal, an attenuator determines an attenuation level of a signal provided from the transmission side. When calibrating mismatching and non-linearity of the reception side, the controller 310 outputs an attenuation control signal of 'low' to decrease an attenuation level by the attenuator.

Thereafter, in step 912, the controller 310 outputs a predetermined test signal, or an I_tx signal, via an I_tx terminal. The I_tx signal output from the controller 310 is provided to a receiver via a transmitter and the switch. The receiver provides a reception signal, or an I_rx signal, to the controller 310. The controller 310 is provided with the I_rx signal via an I_rx terminal. At this point, no signal must be received via a Q_rx terminal. However, because of the mismatching between the I channel and the Q channel, a signal with an unspecified wave, or a Q_rx mismatching signal, appears via the Q_rx terminal. An example of the Q_rx mismatching signal is illustrated in FIG. 5.

In step 914, the controller 310 estimates mismatching occurring due to the I_tx signal, and in step 916, the controller 310 estimates non-linearity occurring due to the I_tx signal from the I_rx signal provided via the I_rx terminal.

In step 918, the controller 310 outputs a predetermined test signal, or a Q_tx signal, via a Q_tx terminal. The Q_tx signal output from the controller 310 is provided to the receiver via the transmitter and the switch. The receiver provides a reception signal, or a Q_rx signal, to the controller 310. The controller 310 is provided with the Q_rx signal via a Q_rx terminal. At this point, no signal must be received via an I_rx terminal. However, because of the mismatching between the I channel and the Q channel, a signal with an unspecified wave, or an I_rx mismatching signal, appears via the I_rx terminal. As described above, an example of the I_rx mismatching signal is illustrated in FIG. 5.

In step 920, the controller 310 estimates mismatching occurring due to the Q_tx signal, and then in step 922, the controller 310 estimates non-linearity occurring due to the Q_tx signal from the Q_rx signal provided via the Q_rx terminal.

Thereafter, in step 924, the controller 310 controls the transmitter to calibrate the mismatching estimated in the steps 914 and 920. In step 926, the controller 310 controls the transmitter to calibrate the non-linearity estimated in the steps 916 and 922.

If the calibration of TX mismatching and TX non-linearity on an I-channel signal and a Q-channel signal is completed in the transmission side, the controller 310 proceeds to step 928 where it outputs a switching control signal and an attenuation control signal for initializing a path and an attenuation for calibrating the TX mismatching and the TX non-linearity.

As can be understood from the foregoing description, the present invention easily calibrates non-linearity and mismatching between an I channel and a Q channel using a transmitter and a receiver included in a mobile terminal, without an extra circuit and extra power consumption. As a result, it is possible to minimize the production cost of a mobile terminal and provide a digital self-calibration apparatus capable of adaptively calibrating non-linearity and mismatching according to variation in an environment.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter, and having an in-phase input terminal and a quadrature-phase input terminal connected to the receiver, the method comprising the steps of:

provding an output of the transmitter to the receiver via the switch;

generating a first test signal associated with the in-phase output terminal and transmitting the first test signal through the transmitter;

detecting an in-phase measurement signal provided via the in-phase input terminal and a quadrature-phase measurement signal provided via the quadrature-phase input terminal by processing the first test signal received via the switch in the receiver;

if the quadrature-phase measurement signal does not have a value approaching '0', calibrating mismatching of the quadrature-phase measurement signal by controlling the receiver, estimating distortion in the in-phase measurement signal, and then calibrating the distortion of the in-phase measurement signal by controlling the receiver;

generating a second test signal associated with the quadrature-phase output terminal, and transmitting the second test signal via the transmitter;

detecting an in-phase measurement signal provided via the in-phase input terminal and a quadrature-phase measurement signal provided via the quadrature-phase input terminal by processing the second test signal received via the switch in the receiver;

if the in-phase measurement signal does not have a value approaching '0', calibrating mismatching of the in-phase measurement signal by controlling the receiver, estimating distortion in the quadrature-phase measurement signal, and then calibrating the distortion of the quadrature-phase measurement signal by controlling the receiver; and if the calibration of the mismatching and the distortion is completed, controlling the switch to cut off a connection between the output terminal of the transmitter and the input terminal of the receiver.

2. The method of claim 1, further comprising the step of attenuating at least one of the first and the second test signals transmitted from the transmitter at a predetermined rate under the control of the controller.

3. A method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter, and having an in-phase input terminal and a quadrature-phase input terminal connected to the receiver, the method comprising the steps of:

providing an output of the transmitter to the receiver via the switch;

generating a first test signal associated with the in-phase output terminal and transmitting the first test signal through the transmitter;

detecting an in-phase measurement signal provided via the in-phase input terminal and a quadrature-phase measurement signal provided via the quadrature-phase input terminal by processing the first test signal received via the switch in the receiver;

if the quadrature-phase measurement signal does not have a value approaching '0', calibrating mismatching of the quadrature-phase measurement signal by controlling the transmitter, estimating distortion in the in-phase measurement signal, and then calibrating the distortion of the in-phase measurement signal by controlling the transmitter;

generating a second test signal associated with the quadrature-phase output terminal, and transmitting the second test signal via the transmitter;

detecting an in-phase measurement signal provided via the in-phase input terminal and a quadrature-phase measurement signal provided via the quadrature-phase input terminal by processing the second test signal received via the switch in the receiver;

if the in-phase measurement signal does not have a value approaching '0', calibrating mismatching of the in-phase measurement signal by controlling the transmitter, estimating distortion in the quadrature-phase measurement signal, and then calibrating the distortion of the quadrature-phase measurement signal by controlling the transmitter; and if the calibration of the mismatching and the distortion is completed, controlling the switch to cut off a connection between the output terminal of the transmitter and the input terminal of the receiver.

4. The method of claim 3, further comprising the step of attenuating at least one of the first and second test signals transmitted from the transmitter at a predetermined rate under the control of the controller.

5. A method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter, and having an in-phase input terminal and a quadrature-phase input terminal connected to the receiver, the method comprising the steps of:

providing an output of the transmitter to the receiver via the switch;

generating a first test signal associated with the in-phase output terminal and transmitting the first test signal through the transmitter;

estimating mismatching in a first quadrature-phase measurement signal provided via the quadrature-phase input terminal and non-linearity in a first in-phase measurement signal provided via the in-phase input terminal, by processing the first test signal received via the switch in the receiver;

generating a second test signal associated with the quadrature-phase output terminal, and transmitting the second test signal via the transmitter;

estimating mismatching in a second in-phase measurement signal provided via the in-phase input terminal and non-linearity in a second quadrature-phase measurement signal provided via the quadrature-phase input terminal, by processing the second test signal received via the switch in the receiver;

calibrating, in the receiver, the mismatching measured on the first quadrature-phase measurement signal and the second in-phase measurement signal and the non-linearity measured on the first in-phase measurement signal and the second quadrature-phase measurement signal; and if the calibration of the mismatching and the distortion is completed, controlling the switch to cut off a connection between the output terminal of the transmitter and the input terminal of the receiver.

6. The method of claim 5, further comprising the step of attenuating at least one of the first and second test signals transmitted from the transmitter at a predetermined rate under the control of the controller.

7. A method for self-calibrating mismatching and non-linearity occurring in a receiver in a mobile terminal including a transmitter, the receiver, a switch for connecting an output terminal of the transmitter to an input terminal of the receiver, and a controller having an in-phase output terminal and a quadrature-phase output terminal connected to the transmitter, and having an in-phase input terminal and a quadrature-phase input terminal connected to the receiver, the method comprising the steps of:

providing an output of the transmitter to the receiver via the switch;

generating a first test signal associated with the in-phase output terminal and transmitting the first test signal through the transmitter;

estimating mismatching in a first quadrature-phase measurement signal provided via the quadrature-phase input terminal and non-linearity in a first in-phase measurement signal provided via the in-phase input terminal, by processing the first test signal received via the switch in the receiver;

generating a second test signal associated with the quadrature-phase output terminal, and transmitting the second test signal via the transmitter;

estimating mismatching in a second in-phase measurement signal provided via the in-phase input terminal and non-linearity in a second quadrature-phase measurement signal provided via the quadrature-phase input terminal, by processing the second test signal received via the switch in the receiver;

calibrating, in the transmitter, the mismatching measured on the first quadrature-phase measurement signal and the second in-phase measurement signal and the non-linearity measured on the first in-phase measurement signal and the second quadrature-phase measurement signal; and if the calibration of the mismatching and the distortion is completed, controlling the switch to cut off a connection between the output terminal of the transmitter and the input terminal of the receiver.

8. The method of claim 7, further comprising the step of attenuating at least one of the first and the second test signals transmitted from the transmitter at a predetermined rate under the control of the controller.

9. An apparatus for self-calibrating non-linearity in a mobile terminal including a transmitter and a receiver, comprising:

a switch for connecting an output terminal of the transmitter to an input terminal of the receiver according to a switching control signal; and a controller for generating, when calibration on non-linearity is requested, a predetermined test signal after outputting the switching control signal, outputting the generated test signal via the transmitter, estimating non-linearity based on a test signal received via the receiver, calibrating non-linearity in a reception side by controlling the receiver, and calibrating non-linearity in a transmission side by controlling the transmitter.

10. The apparatus of claim 9, further comprising an attenuator for attenuating the test signal transmitted from the transmitter at a predetermined rate under the control of the controller.

11. A method for self-calibrating non-linearity in a mobile terminal including a transmitter, a receiver, and a switch for connecting an output terminal of the transmitter to an input terminal of the receiver, comprising the steps of:

connecting the output terminal of the transmitter to the input terminal of the receiver by controlling the switch;

generating a predetermined test signal, transmitting the predetermined test signal via the transmitter, and estimating non-linearity based on a test signal received via the receiver in response to the transmitted test signal; and calibrating non-linearity in a reception side by controlling the receiver according to the estimation result, and calibrating non-linearity in a transmission side by controlling the transmitter.

12. The method of claim 11, further comprising the step of attenuating the predetermined test signal transmitted from the transmitter at a predetermined rate under the control of the controller.

* * * * *